United States Patent
Suh et al.

(10) Patent No.: US 8,224,327 B2
(45) Date of Patent: Jul. 17, 2012

(54) METHOD AND SYSTEM FOR HANDOFF OF MOBILE NODE IN MOBILE COMMUNICATION SYSTEM SUPPORTING PROXY MOBILE INTERNET PROTOCOL

(75) Inventors: Kyung-Joo Suh, Seoul (KR); Beom-Sik Bae, Suwon-si (KR); Jung-Soo Jung, Seongnam-si (KR); Veronica Kondratieva, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1005 days.

(21) Appl. No.: 11/852,805

(22) Filed: Sep. 10, 2007

(65) Prior Publication Data

US 2008/0080427 A1    Apr. 3, 2008

(30) Foreign Application Priority Data

Sep. 8, 2006  (KR) .................. 10-2006-0086806

(51) Int. Cl.
*H04W 36/00* (2009.01)

(52) U.S. Cl. ........ 455/436; 455/437; 455/438; 455/439; 455/440; 455/441

(58) Field of Classification Search .................. 455/436, 455/437, 438, 440, 441, 442, 443; 370/331
See application file for complete search history.

(56) References Cited

U.S. PATENT DOCUMENTS

| | | |
|---|---|---|
| 6,230,012 B1 | 5/2001 | Willkie et al. |
| 2003/0158938 A1 | 8/2003 | Adatrao et al. |
| 2004/0120277 A1* | 6/2004 | Holur et al. .................. 370/328 |
| 2005/0075107 A1 | 4/2005 | Wang et al. |

FOREIGN PATENT DOCUMENTS

| | | |
|---|---|---|
| KR | 1020000001177 | 1/2000 |
| KR | 1020040073843 | 8/2004 |
| KR | 1020060016113 | 2/2006 |

* cited by examiner

*Primary Examiner* — Kamran Afshar
*Assistant Examiner* — Sayed T Zewari
(74) *Attorney, Agent, or Firm* — The Farrell Law Firm, P.C.

(57) ABSTRACT

Disclosed is a way to solve a problem of an operation error, which may occur in transmitting a Binding Update (BU) or Registration ReQuest (RRQ) message for a mobile node to a home agent due to the fact that a PDSN supports a Proxy Mobile Internet Protocol (PMIP) for the mobile terminal and the corresponding mobile node supports a client mobile IP when there is the mobile node using the client mobile IP in a 3GPP2 mobile communication system supporting the PMIP, thereby enabling efficient communication.

20 Claims, 4 Drawing Sheets

METHOD AND SYSTEM FOR HANDOFF OF MOBILE NODE IN MOBILE COMMUNICATION SYSTEM SUPPORTING PROXY MOBILE INTERNET PROTOCOL

PRIORITY

This application claims priority to an application entitled "Method and System for Handoff of Mobile Node in Mobile Communication System Supporting Proxy Mobile Internet Protocol" filed in the Korean Industrial Property Office on Sep. 8, 2006 and assigned Serial No. 2006-0086806, the contents of which are hereby incorporated by reference.

BACKGROUND OF THE INVENTION

1. Field of the Invention

The present invention relates to a method and system for handoff in a mobile communication system supporting a mobile IP (Internet Protocol), and more particularly to a method and system for efficient handoff in a mobile communication system using a proxy mobile IP.

2. Description of the Related Art

In recent years, IP-based communication networks have remarkably developed by virtue of the rapid progress in Internet technology. In such IP-based communication networks, service data is transmitted/received using an allocated IP address. Network address systems for transmitting data to a mobile station, that is, a mobile node, have also been proposed even in mobile communication systems, and among them is mobile IP technology which is a typical scheme for allocating an IP address to a mobile node. The mobile IP technology has been proposed to provide seamless communication even during handoff, as more users use a mobile node due to the rapid progress in mobile communication systems and an increase in wireless LAN services.

The mobile IP technology is under much discussion in the IETF (Internet Engineering Task Force), one of many standardization associations. The version of the mobile IP technology has recently evolved from mobile IPv4 to mobile IPv6. Similarly, commonly used wired IP-based communication networks were started based on IPv4, but are evolving into IPv6 that is a more advanced type for overcoming IP resource limitation, accommodating increased users and providing various services. The major feature of IPv6 is an increase in the length of an IP address (from 32 bits to 128 bits), which makes it possible to accommodate more subscribers.

The mobile IP technology is problematic in that its protocol itself has too much overhead for use in a mobile communication system. Thus, in order to reduce such overhead, the $3^{rd}$ Generation Partnership Project (3GPP2), one of the standardization associations for mobile communication technology, has proposed proxy mobile IP technology that is currently under standardization. Thereupon, research is being actively conducted to improve the performance of a mobile communication system by using the proxy mobile IP, and particularly the 3GPP2 is now discussing the standards of using the proxy mobile IP for improving handoff performance.

When the proxy mobile IP is used during handoff, there is an advantage in that a handoff delay can be reduced as compared to the conventional mobile IP. However, a mobile node in a wireless environment supporting the proxy mobile IP must perform operations for an IP protocol independently of the wireless environment irrespective of whether it supports a conventional simple IP or the mobile IP. Thus, there is a need for support of a protocol in order to efficiently support handoff in a mobile communication system supporting the proxy mobile IP.

SUMMARY OF THE INVENTION

Accordingly, the present invention has been made to solve at least the above-mentioned problems occurring in the prior art, and the present invention provides a method and system for efficiently performing handoff of a mobile node in a mobile communication system supporting a proxy mobile IP.

Further, the present invention provides a method and system for preventing handoff delay of a mobile node in a mobile communication system supporting a proxy mobile IP.

Further, the present invention provides a method and system for stably performing a registration procedure of a mobile node during its handoff in a mobile communication system supporting a proxy mobile IP.

In accordance with an aspect of the present invention, there is provided a method for handoff of a mobile node using a client mobile IP at a target packet data service node in a mobile communication system supporting a proxy mobile IP, the method including transmitting a handoff request (HO_request) message for the handoff of the mobile node, which moves to an area of the target packet data service node, to a serving packet data service node, and receiving a context transfer; transmitting a binding update message to a home agent of the mobile node, and performing registration for the handoff of the mobile node; and filtering a client mobile IP binding update message when the client mobile IP binding update message is received from the mobile node during a wait for a response to the binding update message from the home agent.

In accordance with another aspect of the present invention, there is provided a system for providing a mobile node using a client mobile IP with handoff, the system including a target packet data service node using a proxy mobile IP for transmitting a handoff request (HO_request) message for the handoff of the mobile node, which moves to an area thereof, to a serving packet data service node, transmitting a binding update message to a home agent of the mobile node, and filtering a client mobile IP binding update message when the client mobile IP binding update message is received from the mobile node during a wait for a response to the binding update message from the home agent; and the serving packet data service node for starting a context transfer to the target packet data service node when receiving the handoff request (HO_request) message from the target packet data service node, checking after the starting of the context transfer if the target packet data service node completes registration to the home agent of the mobile node, and creating a binding update message with no life time and transmitting the created binding update message to the home agent of the mobile node when the target packet data service node has completed the registration to the home agent.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
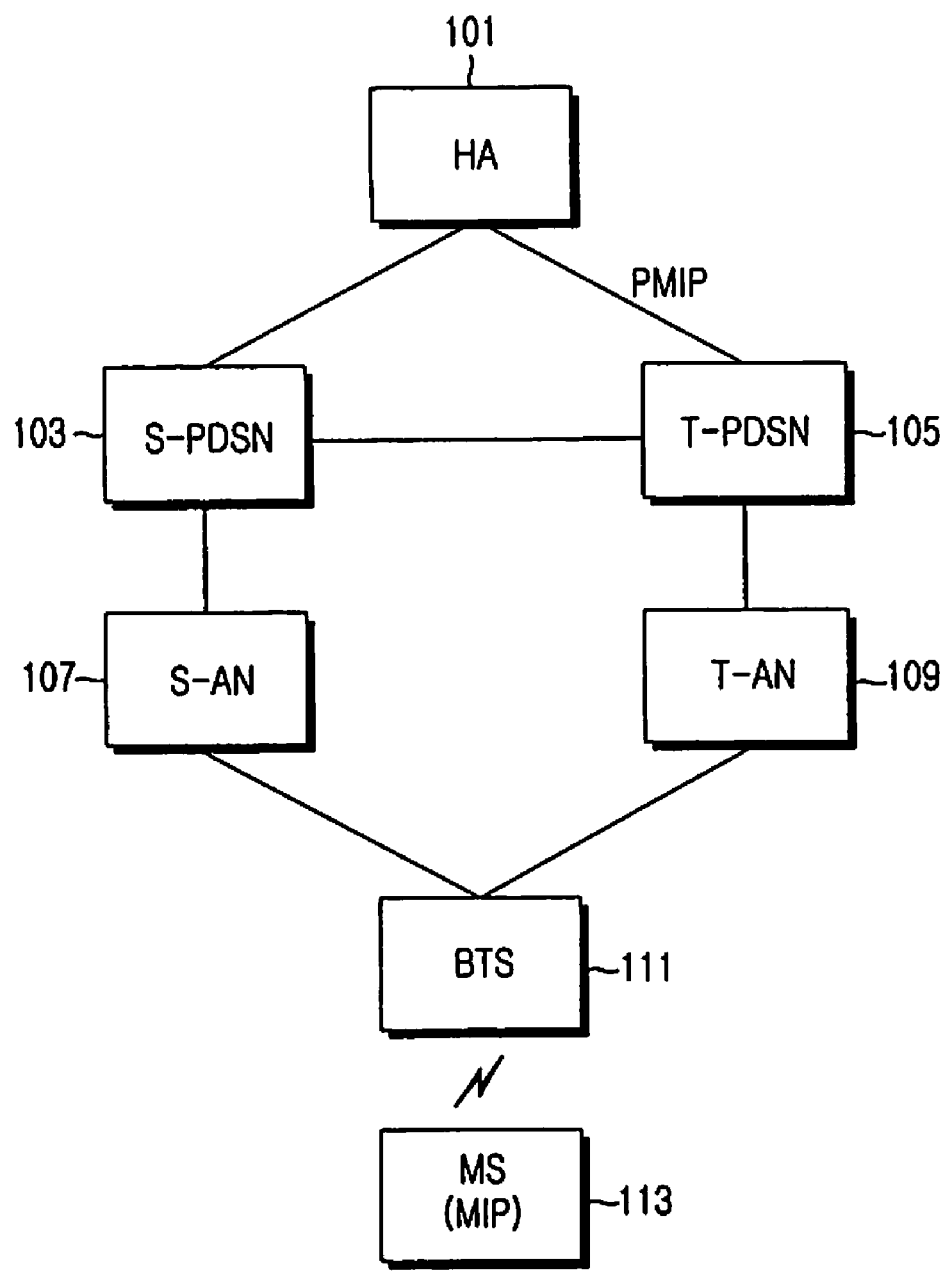
FIG. 1 is a block diagram illustrating a structure of a mobile communication system supporting a proxy mobile IP in accordance with an exemplary embodiment of the present invention.

Hereinafter, exemplary embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted so as not to make the subject matter of the present invention unclear.

Referring to FIG. 1, a serving packet data service node (S-PDSN) 103 which a mobile node 113 accesses before handoff, and a target packet data service node (T-PDSN) 105 which the mobile node 113 will access after the handoff, communicate with each other through a home agent (HA) 101 and the proxy mobile IP (PMIP). It is assumed that the mobile node 113 can use a mobile IP in a wireless environment as illustrated in FIG. 1. The mobile IP is also referred to as a client mobile IP in the 3GPP2. In addition, it is assumed in the wireless environment of FIG. 1 that the mobile node 113 accesses a serving access network (S-AN) 107 that is under the control of the S-PDSN 103, and then moves to a service area of a target access network (T-AN) 109 that is under the control of the T-PDSN 105.

In FIG. 1, when the mobile node 113 using a client mobile IP moves from an area of the S-AN 107 to an area of the T-AN 109, it may transmit a binding update message or a registration request message again to the system before a preset effective life time expires. With regard to this, there may occur a case where the mobile node 113 transmits the registration request message to the system when it does not know that the T-PDSN 105 copes with handoff by using the proxy mobile IP on behalf of the mobile node 113.

That is, when the mobile node 113 moves to an area of the T-AN 109, there may occur a case where the mobile node 113 transmits a binding update (BU) message (hereafter referred to merely as "BU") (in IPv6) or an RRQ (Registration ReQuest) (in IPv4) to the HA 101 at a point of time when it can request registration up to the T-PDSN 105 via a base station transceiver (BTS) 111 and the AN 109 in order to extend corresponding binding before the life time of a binding cache expires or to perform registration before a timer expires. However, when the T-PDSN 105 has already made a request for registration to the HA 101, but has not yet received a response from the HA 101 at that time, an operation error may occur between the operation of the mobile node 113 and the operation of the T-PDSN 105 that operates the proxy mobile IP on behalf of the mobile node 113. Therefore, in the present invention, the T-PDSN 105, the S-PDSN 103 and the HA 101 perform a handoff providing procedure as will be described below in order to prevent such a problem.

In the following description, the terms BU in the case of IPv6 and RRQ in the case of IPv4 will be interchangeably used or BU will be collectively used as a registration request message, and the terms BA (Binding Acknowledgement) in the case of IPv6 and RRP (Registration ResPonse) in the case of IPv4 will be interchangeably used or BA will be collectively used as a response message thereto.

Figure 2:
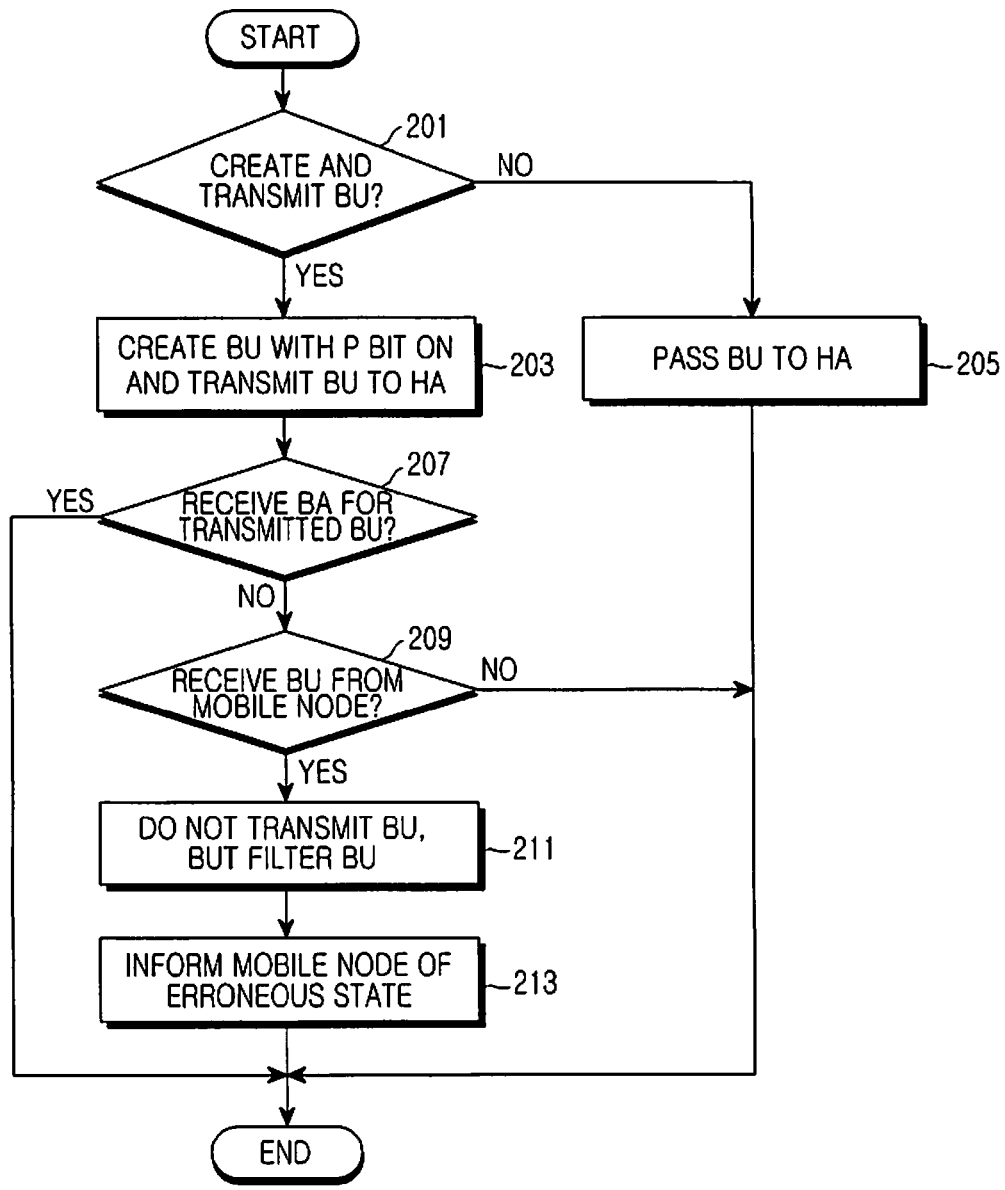
FIG. 2 is a flowchart illustrating a method of providing handoff to be performed at a T-PDSN in a mobile communication system supporting a proxy mobile IP in accordance with an exemplary embodiment of the present invention.

FIG. 2 illustrates a method of providing handoff to be performed at a T-PDSN 105 in a mobile communication system supporting a proxy mobile IP according to the present invention. In describing FIG. 2, the reference numerals of FIG. 1 will be used for designating the respective nodes. Even though the embodiment of the FIG. 2 illustrates the operation of the T-PDSN 105 transmitting BU to HA 101 in the case of using IPv6, the method illustrated in FIG. 2 can also be used for the operation of the T-PDSN 105 transmitting RRO to HA 101 in the case of using IPv4.

In step 201, when the T-PDSN 105 makes a request for registration by using the proxy mobile IP on behalf of the mobile node 113, it determines if it tries to transmit a BU to the HA 101. If the T-PDSN 105 tries to transmit the BU to the HA 101, in step 203, the T-PDSN 105 creates a BU with the P bit on, and transmits the created BU to the HA 101. Here, the P bit is a bit used for informing the HA 101 of using the Proxy Mobile IP (PMIP). The P bit may be separately set, or one bit of many reserved bits may be used as the bit for informing the HA 101 of using the PMIP. The BU with the P bit on is transmitted so as to allow the HA 101 to identify and process the PMIP through the P bit, but any other ways may be used for the same purpose in some cases. An example thereof is to transmit a message representing use of the PMIP to the HA 101 instead of using a bit with an indication, such as the P bit.

Meanwhile, in step 201, if the T-PDSN 105 is determined that it does not tries to transmit the BU to the HA 101, the T-PDSN 105 performs step 205, The T-PDSN 105 receives a BU from the mobile node 113, it neither creates a BU nor transmits the BU to the HA 101. Therefore, the T-PDSN 105 passes the received BU to the HA 101 in step 205.

The T-PDSN 105 determines in step 207 if it receives a BA for the BU transmitted to the HA 101 in step 203. Here, the BA is a binding acknowledgement message corresponding to a response message by which the HA 101 indicates a success in receiving a proxy BU or BU transmitted from the T-PDSN 105 or the mobile node 113. The T-PDSN 105 determines if the BA is received can be determined based on, for example, a sequence number, an NAI (Network Access Identifier), information on a home address of the mobile node, etc., included in the BA.

When the T-PDSN 105 does not receive the BA in step 207, it determines in step 209 if it receives a BU from the mobile node 113. When the T-PDSN 105 receives the BU from the mobile node 113, the T-PDSN 105 does not transmit a BU received from the mobile node 113, but filters the received BU in step 211. Further, in step 213, the T-PDSN 105 informs the mobile node 113, that a corresponding BU is in an erroneous state where it cannot be processed. In order to inform the mobile node 113 of this, the T-PDSN 105 may use a separate message.

Figure 3:
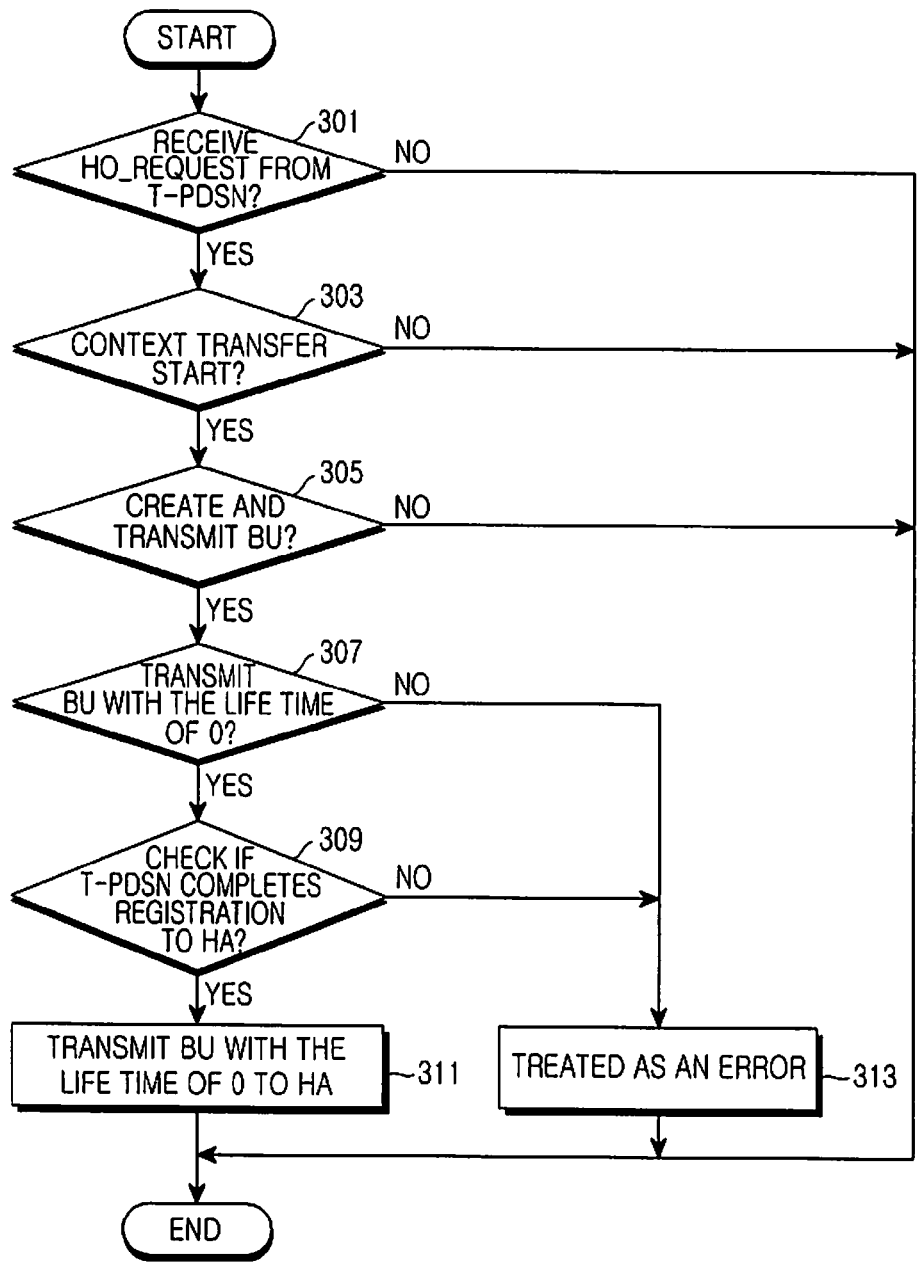
FIG. 3 is a flowchart illustrating a method of providing handoff to be performed at an S-PDSN in a mobile communication system supporting a proxy mobile IP in accordance with an exemplary embodiment of the present invention.

FIG. 3 illustrates a method of providing handoff to be performed at an S-PDSN 103 in a mobile communication system supporting a proxy mobile IP according to the present invention.

In step 301 of FIG. 3, the S-PDSN 103 determines if it receives a handoff request message (HO_request) from the T-PDSN 105. If the S-PDSN 103 receives the HO_request, it transmits a handoff response message (HO_response) to the T-PDSN 105 (this is not illustrated in the drawing). The S-PDSN 103 starts a context transfer in step 303. If the context transfer starts, the S-PDSN 103 checks in step 305 if it creates a BU by itself and transmits the created BU to the HA 101. If the S-PDSN 103 creates a BU by itself and transmits the created BU to the HA 101, the S-PDSN 103 determines in step 307 if it sets a life time of the BU to "0" and the BU with the life time of 0 transmits to the HA 101. When the BU with the life time of 0 is transmitted to the HA 101, prior to transmitting the BU to the HA 101, the S-PDSN 103 checks in step 309 if the T-PDSN 105 completes registration to the HA 101. In step 309, some ways to check the completion of registration may be used, including a way for the S-PDSN 103 to receive a message indicating whether the T-PDSN 105 completes registration from the T-PDSN 105, a way for the S-PDSN 103 to receive a message indicating the completion of registration from the HA 101, a way for the S-PDSN 103 to know the completion of registration based on whether a GRE (Generic Routing Encapsulation) tunnel between the S-PDSN 103 and the T-PDSN 105 is deleted, etc.

Meanwhile, if the S-PDSN 103 transmits the BU, but the life time of the BU is not set to "0" in step 307, the S-PDSN 103 this is not a process for revoking a binding cache entry of the HA 101, so the S-PDSN 103 treats the corresponding BU as an error in step 313. Also, when the S-PDSN 103 tries to transmit the BU in step 307 despite the fact that the T-PDSN 105 does not complete registration to the HA 101, this is also treated as an error in step 313.

In step 309, when the T-PDSN 105 completes registration to the HA 101, the S-PDSN 103 revokes a binding cache entry in the HA 101 by transmitting the corresponding BU with the life time of 0 to the HA 101 determining a life time or a point of time when the BU is transmitted has been completed.

Since the HA 101 can determine whether the corresponding BU is transmitted from the T-PDSN 105 or the mobile node 113 by checking if the T-PDSN 105 transmits the BU with the P bit on, it can prevent an operation error by means of its data structure management method, even if the T-PDSN 105 fails in filtering the BU according to the procedure of FIG. 2.

Figure 4:
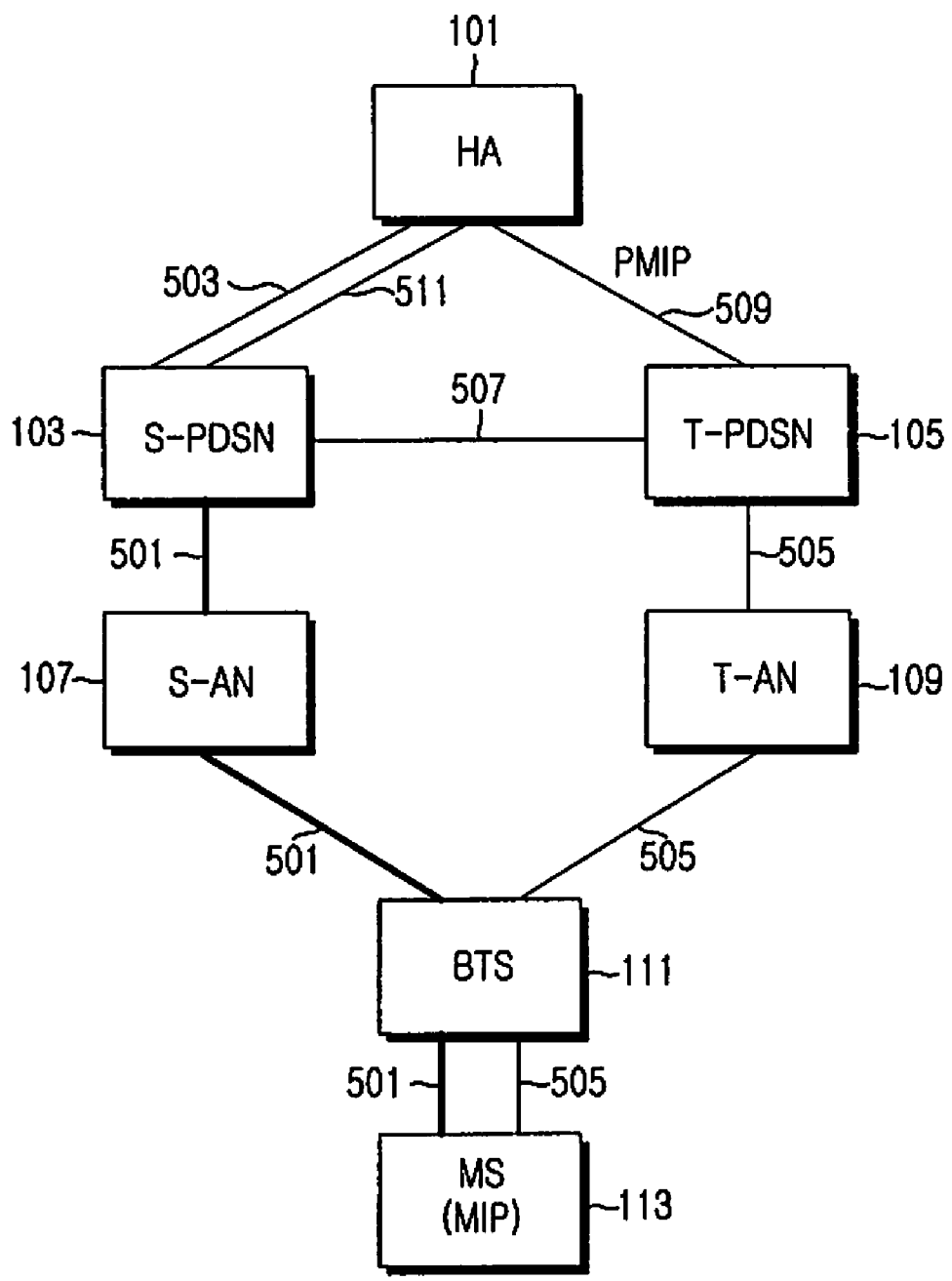
FIG. 4 illustrates a procedure of providing handoff in a mobile communication system supporting a proxy mobile IP in accordance with an exemplary embodiment of the present invention.

FIG. 4 illustrates a view for explaining a procedure of providing handoff in a mobile communication system supporting a proxy mobile IP according to the present invention, and the procedure of FIG. 4 corresponds to a concrete way to prevent a malfunction of a mobile node using a mobile IP and support the proxy mobile IP and the mobile IP in the wireless environment supporting the mobile IP, as described in FIGS. 1 through 3.

In FIG. 4, the mobile node 113 using the mobile IP, that is, a client mobile IP, performs communication through the HA 101, the S-PDSN 103, the S-AN 107 and the BTS 111 in paths 501 and 503. Subsequently, when the mobile node 113 moves to an area of the T-AN 109 and performs high-speed handoff, a state capable of communication is prepared from the mobile node 113 to the T-PDSN 105 via the BTS 111 and the T-AN 109 in path 505. Then, the T-PDSN transmits a handoff request message (HO_request) to the S-PDSN 103 and receives a context transfer in path 507. In path 509, registration is performed by transmitting a proxy BU from the T-PDSN 105 to the HA 101. In the present invention, by performing the operations as described in steps 209 to 213 of FIG. 2, the T-PDSN 105 can prevent a client mobile IP BU from being passed from the mobile node 113 to the HA 101 through path 505 in a state where the T-PDSN 105 does not receive a proxy BA from the HA 101. Further, after the BU operation in path 509 is completed, the operations as described in steps 305 to 311 are performed in path 511 in order to not falsely pass a PMIP revocation process sent from the S-PDSN 103, so that operation errors of PMIP and MIP through the S-PDSN 103 and the T-PDSN 105 are prevented and thus normal communication can be ensured.

As described above, the present invention provides a way to prevent an operation error that may occur in the progress of transmitting a BU or RRQ for a mobile node to a home agent due to the fact that a PDSN supports a proxy mobile IP (PMIP) and the corresponding mobile node supports a client mobile IP when there is the mobile node using the client mobile IP in a mobile communication system supporting the PMIP, thereby enabling efficient communication.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for a handoff of a mobile node using a client mobile Internet Protocol (IP) at a Target Packet Data Service Node (T-PDSN) in a mobile communication system supporting a Proxy Mobile IP (PMIP), the method comprising the steps of:

if the mobile node moves to an area of the T-PDSN, transmitting, to a Serving Packet Data Service Node (S-PDSN), a HandOff request (HO_request) message for the handoff of the mobile node;

receiving a context of the mobile node from the S-PDSN;

transmitting a first binding update message to a Home Agent (HA) of the mobile node;

performing registration for the handoff of the mobile node; and filtering a second binding update message according to the client mobile IP and informing the mobile node of an incapability of processing the second binding update message, when the second binding update message is received from the mobile node during a wait for a response to the first binding update message from the HA.

2. The method of claim 1, wherein the first binding update message includes a bit representing use of the PMIP.

3. The method of claim 1, further comprising informing the HA of using the PMIP before transmitting the first binding update message to the HA.

4. The method of claim 1, wherein performing the registration for the handoff of the mobile node comprises:

checking if a binding acknowledgement message is received from the HA, in response to the first binding update message.

5. The method of claim 4, wherein at least one of a sequence number, a network access identifier, and home address information of the mobile node included in the binding acknowledgement message is used for checking if the binding acknowledgement message is received.

6. The method of claim 1, further comprising transmitting the second binding update message, instead of the first binding update message, to the HA, when the second binding update message is received from the mobile node before transmitting the first binding update message to the HA.

7. A method for a handoff of a mobile node using a client mobile Internet Protocol (IP) at a Serving Packet Data Service Node (S-PDSN) in a mobile communication system supporting a Proxy Mobile IP (PMIP), the method comprising the steps of:

transmitting a context of the mobile node to a Target Packet Data Service Node (T-PDSN) when a handoff request (HO_request) message from the T-PDSN is received;

after transmission of the context starts, checking if the T-PDSN is registered to a Home Agent (HA) of the mobile node; and if the T-PDSN is registered to the HA, creating a binding update message with no life time, and transmitting the created binding update message to the HA, when it is required to create a binding update message with the life time, after the transmission of the context starts, treating it as an error.

8. The method of claim 7, wherein checking if the T-PDSN is registered to the HA comprises:

receiving a indicating message representing whether the T-PDSN is registered to the HA from the T-PDSN; and checking if the T-PDSN is registered to the HA using the indicating message.

9. The method of claim 7, wherein checking if the T-PDSN is registered to the HA comprises:

receiving, from the HA, a registration completion message representing whether registration of the T-PDSN is completed; and checking if the T-PDSN is registered to the HA using the registration completion message.

10. The method of claim 7, wherein checking if the T-PDSN is registered to the HA comprises determining whether a Generic Routing Encapsulation (GRE) tunnel set between the T-PDSN and the S-PDSN is deleted.

11. A Target Packet Data Service Node (T-PDSN) in mobile communication system supporting a Proxy Mobile Internet Protocol (PMIP) comprising:

a controller for, if a mobile node moves to an area of the T-PDSN, transmitting to a Service Packet Data Service Node (S-PDSN) a handoff request (HO_request) message for a handoff of the mobile node, receiving a context of the mobile node from the S-PDSN, transmitting a first binding update message to a Home Agent (HA), registering for the handoff of the mobile node, and filtering a second binding update message according to a client mobile Internet Protocol (IP) and informs the mobile node of an incapability of processing the second binding update message, when the second binding update message is received from the mobile node during a wait for a response to the first binding update message from the HA;

a transmitter for transmitting the HO_request message to the S-PDSN, and transmitting the first binding update message to the HA, according to control of the controller; and a receiver for receiving the context of the mobile node from the S-PDSN, and the second binding update message is received from the mobile node, according to control of the controller.

12. The T-PDSN of claim 11, wherein the first binding update message comprises a bit representing use of the PMIP.

13. The T-PDSN of claim 11, wherein the controller informs the HA of using the PMIP before the transmitter transmits the first binding update message to the HA.

14. The T-PDSN of claim 11, wherein the controller checks if a binding acknowledgement message transmitted from the HA is received by the receiver, in response to the first binding update message.

15. The T-PDSN of claim 14, wherein the controller checks if the binding acknowledgement message is received by using at least one of a sequence number, a network access identifier and home address information of the mobile node included in the binding acknowledgement message.

16. The T-PDSN of claim 11, wherein the controller controls the transmitter, such that the transmitter transmits the second binding update message, instead of the first binding update message, to the HA, when the second binding update message is received from the mobile node, before transmitting the first binding update message to the HA.

17. A Serving Data Service Node (S-PDSN) mobile communication system supporting a Proxy Mobile Internet Protocol (PMIP) comprising:

a controller for transmitting a context of a mobile node to a Target Packet Data Service Node (T-PDSN), when a handoff request (HO_request) message from the T-PDSN is received, checking if the T-PDSN is registered to a Home Agent (HA) of the mobile node, after transmission of the context starts, if the T-PDSN is registered to the HA, generating a binding update message with no life time, and transmitting the generated binding update message to the HA, treats as an error when it is required to create a binding update message with the life time, after the transmission of the context starts;

a transmitter for transmitting the context to the T-PDSN, and transmitting the generated binding update message to the HA, according to control of the controller; and a receiver for receiving the HO_request message from the T-PDSN, according to control of the controller.

18. The S-PDSN of claim 17, wherein the receiver receives an indicating message representing whether the T-PDSN is registered to the HA from the T-PDSN, and the controller checks if the T-PDSN is registered to the HA using the indicating message.

19. The S-PDSN of claim 17, wherein the receiver receives a registration completion message representing that registration of the T-PDSN is completed from the HA, and the controller checks if the T-PDSN is registered to the HA using the registration completion message.

20. The S-PDSN of claim 17, wherein the controller checks if the T-PDSN is registered to the HA based on whether a Generic Routing Encapsulation (GRE) tunnel set between the T-PDSN and the S-PDSN is deleted.

* * * * *